US009029290B2

(12) United States Patent
Lee et al.

(10) Patent No.: US 9,029,290 B2
(45) Date of Patent: May 12, 2015

(54) COMPOSITE OF POROUS SUBSTRATE AND ONE-DIMENSIONAL NANOMATERIAL AND METHOD FOR PREPARING THE SAME, SURFACE-MODIFIED COMPOSITE AND METHOD FOR PREPARING THE SAME

(75) Inventors: Chunsing Lee, Hong Kong (CN);
Shuittong Lee, Hong Kong (CN);
Yongbing Tang, Hong Kong (CN);
Mankeung Fung, Hong Kong (CN);
Chiuyee Chan, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 0 days.

(21) Appl. No.: 13/585,707

(22) Filed: Aug. 14, 2012

(65) Prior Publication Data
US 2013/0045857 A1 Feb. 21, 2013

(30) Foreign Application Priority Data

Aug. 17, 2011 (CN) .......................... 2011 1 0241568

(51) Int. Cl.
*B01J 20/26* (2006.01)
*C09K 3/32* (2006.01)
*B01J 20/06* (2006.01)
(Continued)

(52) U.S. Cl.
CPC . *C09K 3/32* (2013.01); *B01J 20/06* (2013.01);
*B01J 20/0281* (2013.01); *B01J 20/28007*
(2013.01); *B01J 20/3078* (2013.01); *B01J 20/3085* (2013.01); *B01J 20/28004* (2013.01);
*B01J 20/0285* (2013.01); *B01J 20/0274*
(2013.01); *B82Y 30/00* (2013.01); *Y10S 977/892* (2013.01); *Y10S 977/781* (2013.01)

(58) Field of Classification Search
CPC ............ B01J 20/06; B01J 20/04; B01J 20/32; B01J 20/02; B01D 53/02
USPC .............. 502/5, 400, 401, 402, 406; 977/832, 977/781
See application file for complete search history.

(56) References Cited

U.S. PATENT DOCUMENTS

2009/0018249 A1* 1/2009 Kanagasabapathy et al. .............................. 524/434
2010/0233812 A1* 9/2010 Sun et al. ...................... 435/401

OTHER PUBLICATIONS

Hai Hu, Wenjun Xiao, Jian Yuan, Jianwei Shi, and Wenfeng Shangguan, TiO2/SiO2 Composite Films Immobilized on Foam Nickel Substrate for the Photocatalytic Degradation of Gaseous Acetaldehyde, Jan. 2008, International Journal of Photoenergy, vol. 2008, Article ID 679421.*

(Continued)

*Primary Examiner* — Colleen Dunn
*Assistant Examiner* — Haytham Soliman
(74) *Attorney, Agent, or Firm* — The Marbury Law Group, PLLC

(57) ABSTRACT

The present invention relates to a composite of a porous substrate and one-dimensional nanomaterial, which is manufactured by a hydrothermal method. The method for manufacturing the composite of the present invention is simple and low-cost, and the one-dimensional nanomaterial is homogeneously distributed on the porous substrate with tight binding at the interface. The present invention also relates to a surface-modified composite and a method for preparing the same. The composite of the present invention which is hydrophobically modified at the surface can adsorb organic solvents such as toluene, dichlorobenzene, petroleum ether and the like, and greases such as gasoline, lubricating oil, motor oil, crude oil and the like, with a weight adsorption ratio of >10.

8 Claims, 2 Drawing Sheets

(51) Int. Cl.
   *B01J 20/02* (2006.01)
   *B01J 20/28* (2006.01)
   *B01J 20/30* (2006.01)
   *B82Y 30/00* (2011.01)

(56) References Cited

OTHER PUBLICATIONS

Adebajo, M.O. et al., "Porous Materials for Oil Spill Cleanup: A Review of Synthesis and Absorbing Properties," Journal of Porous Materials, 2003, vol. 10, pp. 159-170.

Bayat, Admad et al., "Oil Spill Cleanup from Sea Water by Sorbent Materials," Chem. Eng. Technol., 2005, vol. 28, No. 12, pp. 1525-1528.

Teas, Ch. et al., "Investigation of the Effectiveness of Absorbent Materials in Oil Spills Clean Up," Desalination, 2001, vol. 140, pp. 59-264.

Yuan, Jikang et al., "Superwetting Nanowire Membranes for Selective Absorption." Nature, Jun. 2008, vol. 3, pp. 332-336.

* cited by examiner

COMPOSITE OF POROUS SUBSTRATE AND ONE-DIMENSIONAL NANOMATERIAL AND METHOD FOR PREPARING THE SAME, SURFACE-MODIFIED COMPOSITE AND METHOD FOR PREPARING THE SAME

FIELD OF THE INVENTION

This invention relates to a composite of a porous substrate and a one-dimensional nanomaterial and a method for preparing the same, and to a surface-modified composite and a method for preparing the same.

BACKGROUND OF THE INVENTION

Since the discovery of carbon nanotubes by Iijima in 1991 via arc evaporation, one-dimensional (1D) nanostructures (such as nanotubes, nanowires, nanobelts, etc.) have become a new study focus. Due to the size effect and large surface areas thereof, 1D nanostructural materials possess many superior properties to conventional materials. 1D nanostructures not only provide an ideal model for fundamental studies on nanomaterials, but also have a wide prospect of technological applications. For example, many recent attentions have been focused on the applications of 1D nanostructures in catalytic support, bimolecular purification, environmental protection, and desalination. While 1D nanostructured materials possess large surface areas, modulating of their wettability from super-hydrophilic to super-hydrophobic may be achieved, which endow them important abilities for applications in water treatment, such as adsorption of leaked oil and decontamination of toxic metal ions.

Porous materials have unique structures and excellent properties in adsorption, ion exchange and catalysis, and therefore may be widely used in aeronautics and space industry, petroleum, chemical industry, chemical fibers, mechanics, instruments, biology, pharmaceutics, food, water purification, de-dusting, etc. However, traditional porous materials may not fulfill the high requirements of the rapid technological progress. It is then expected that combination of nanomaterials with porous materials will greatly increase the specific surface area of the porous materials, resulting in significant improvement of their overall properties. The emphasis on the studies of such combined materials is to explore a facile and low-cost method to prepare samples in large scale to fulfill the demand. Until now, there has been no report on the synthesis of 1D nanostructural materials on porous material substrates and their applications in oil adsorption. The difficulties lie in: i) modulating the growth process to synthesize 1D nanostructures with controllable size and morphology, such as nanowire, nanorod, and nanobelt, etc. on a porous foamed substrate; ii) preparing 1D nanostructures on porous foamed substrates in large scale via a facile and low-cost method and applying them to practical applications such as leaked crude oil adsorption and decontamination of toxic metal ions in water.

SUMMARY OF THE INVENTION

The present invention provides a composite of a porous substrate and a one-dimensional nanomaterial and a method for preparing the same. The present invention further provides a surface-modified composite of a porous substrate and a one-dimensional nanomaterial and a method for preparing the same.

According to one aspect of the present invention, the present invention provides a composite of a porous substrate and a one-dimensional nanomaterial, wherein the porous substrate in the composite is selected from porous materials having a porosity of 70% or above, including porous foamed metal, porous foamed plastics, alloy, organic substance or ceramics, and metallic skeleton with three-dimensional network of pores of 100 nm to 1 mm.

According to another aspect of the present invention, the present invention provides a method for manufacturing the composite of the present invention, comprising:
1) immersing the porous substrate in a catalytic seed solution, and sonicating for 1-180 min;
2) drying the soaked porous substrate obtained in step 1), and annealing at 200-500° C. for 1-180 min; and
3) immersing the substrate obtained in step 2) in a growth solution to obtain the composite of a porous substrate and a one-dimensional nanomaterial.

According to another aspect of the present invention, the present invention provides a surface-modified composite of a porous substrate and a one-dimensional nanomaterial, wherein the surface of the above composite is modified to become super-hydrophobic.

According to another aspect of the present invention, the present invention provides a method for manufacturing the surface-modified composite of the present invention, comprising coating a layer of hydrophobic material on the un-modified composite.

DETAILED DESCRIPTION OF THE PREFERRED EMBODIMENTS

Figure 1:
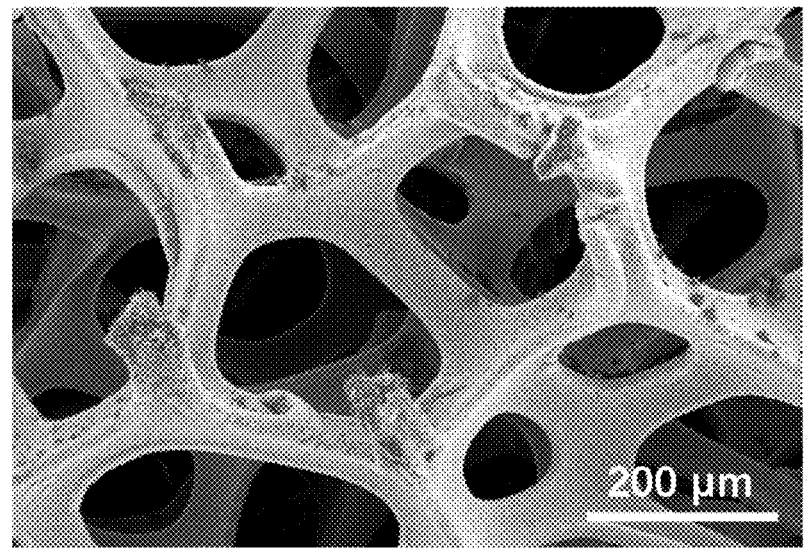
FIG. 1: A low-magnification scanning electron microscopy (SEM) image of ZnO nanowires on porous foamed nickel substrate.

The present invention provides a composite of a porous substrate and a one-dimensional nanomaterial and a method for preparing the same. The present invention further provides a surface-modified composite of a porous substrate and a one-dimensional nanomaterial and a method for preparing the same.

According to one aspect of the present invention, the present invention provides a composite of porous substrate and a one-dimensional nanomaterial, wherein the porous substrate in the composite is selected from porous materials having a porosity of 70% or above, including porous foamed metal, porous foamed plastics, alloy, organic substance or ceramics, and metallic skeleton with three-dimensional network of pores of 100 nm to 1 mm.

According to one embodiment of the present invention, the porous substrate is preferably porous foamed nickel.

According to another embodiment of the present invention, the one-dimensional nanomaterial in the composite includes nanowire, nanorod, nanobelt, nanotube, and the like.

According to one embodiment of the present invention, the one-dimensional nanomaterial is nanowire, nanorod or nanotube, with a diameter of 10-200 nm and a length of 500 nm to 50 μm. For example, the diameter may be 50-150 nm, 100-

200 nm, 20-100 nm, 20-50 nm, or 50-150 nm, and the length may be 1-3 µm, 2-5 µm, 3-4 µm or 0.5-5 µm.

According to another embodiment of the present invention, the one-dimensional nanomaterial is nanobelt, with a width of 500 nm to 20 µm, a thickness of 20-100 nm, and a length of 5-100 µm.

According to another embodiment of the present invention, the one-dimensional nanomaterial in the composite is distributed on the porous substrate with a density of $10^8$-$10^{12}$/cm$^2$. For example, the density of distribution may be $10^9$-$10^{12}$/cm$^2$ or $10^8$-$10^{11}$/cm$^2$.

According to another embodiment of the present invention, the one-dimensional nanomaterial is selected from oxides, such as zinc oxide, titanium oxide, and the like; selenides, such as zinc selenide, copper selenide, nickel selenide, cobalt selenide, iron selenide, manganese selenide, chromium selenide, vanadium selenide, titanium selenide, scandium selenide, and the like; sulfides, such as copper sulfide, and zinc sulfide, and the like; and sulfates, such as zinc sulfate, copper sulfate, nickel sulfate, cobalt sulfate, iron sulfate, manganese sulfate, chromium sulfate, vanadium sulfate, titanium sulfate or scandium sulfate, and the like.

According to another embodiment of the present invention, the one-dimensional nanomaterial in the composite is zinc oxide and the porous substrate is porous foamed nickel.

According to one embodiments of the present invention, the composite of the porous substrate and a one-dimensional nanomaterial is manufactured by a hydrothermal method.

According to another aspect of the present invention, the present invention provides a method for manufacturing the composite of the present invention, comprising:

1) immersing the porous substrate in a catalytic seed solution, and sonicating for 1-180 min;
2) drying the soaked porous substrate obtained in step 1), and annealing at 200-500° C. for 1-180 min; and
3) immersing the substrate obtained in step 2) in a growth solution to obtain the composite of a porous substrate and a one-dimensional nanomaterial.

Optionally, the porous substrate may be washed with an anhydrous solvent, e.g. absolute ethanol, prior to step 1) to improve the porosity of the porous substrate. Preferably, the porosity of the porous substrate is 70% or above.

According to one embodiment of the present invention, the sonicating in step 1) lasts for 1-180 min, e.g. 20-100 min.

According to one embodiment of the present invention, when the one-dimensional nanomaterial is zinc oxide, the catalytic seed solution in step 1) is a solution of zinc acetate dissolved in absolute ethanol, and the concentration of zinc acetate is preferably $10^{-4}$-0.1 mol/L or $10^{-3}$-$5 \times 10^{-3}$ mol/L.

According to one embodiment of the present invention, the annealing in step 2) is carried out at 200-500° C. for 20-40 min.

According to another embodiment of the present invention, when the one-dimensional nanomaterial is zinc oxide, the growth solution in step 3) is a mixed solution of urotropine, polyethanolamine and zinc nitrate hexahydrate dissolved in deionized water. The concentrations of urotropine, polyethanolamine and zinc nitrate hexahydrate in the growth solution are preferably 0.1-5 wt %, 0.1-10 wt %, and 0.1-2 wt %, respectively. For example, the concentration of urotropine may be 0.35-2.0 wt %, the concentration of polyethanolamine may be 0.2-5 wt %, and the concentration of zinc nitrate hexahydrate may be 0.5-1 wt %.

According to another embodiment of the present invention, step 3) is carried out at growth temperature of 50-180° C. and reaction time of 6-48 h. Preferably, the growth temperature is 80-110° C., and the reaction time is 13-24 h.

According to another embodiment of the present invention, when the obtained composite is a composite of a porous substrate and zinc oxide, the composite may be immersed in a solution of −2 valent selenide to form a composite of a porous substrate and zinc oxide and zinc selenide, and the latter may be optionally immersed in a solution of +2 valent copper to form a composite of a porous substrate and zinc oxide and copper selenide.

According to another aspect of the present invention, the present invention provides a surface-modified composite of a porous substrate and a one-dimensional nanomaterial, wherein the surface of the above composite is modified to become super-hydrophobic.

According to one embodiment of the present invention, the surface-modified composite refers to a process wherein a layer of silicone oil is formed on un-modified surface of the composite.

According to one embodiment of the present invention, the contact angle between the surface-modified composite and water is >150°. In the present invention, the contact angle between the composite and water may be measured by a conventional method in the art.

According to one embodiment of the present invention, the surface-modified composite has a weight adsorption ratio of >10 to organic solvents or greases. The organic solvents are preferably selected from one or more of toluene, dichlorobenzene, gasoline and petroleum ether, and the greases are preferably selected from one or more of lubricating oil, motor oil and crude oil.

According to another aspect of the present invention, the present invention provides a method for manufacturing the surface-modified composite of the present invention, comprising coating a layer of hydrophobic material on the un-modified composite.

According to one embodiment of the present invention, the coating refers to coating silicon oil on the surface of the composite by gas phase deposition. Preferably, the gas phase deposition is carried out at 100-300° C. for 30-180 min, preferably at 110-120° C. for 60-180 min.

According to one embodiment of the present invention, the un-modified composite of porous substrate and zinc oxide one-dimensional nanomaterial (preferably the composite of porous foamed nickel and zinc oxide one-dimensional nanowire) is immerse in a solution of −2 valent selenium ion, and selenium and sodium borohydride are dissolved together in deionized water to form a solution of selenium ion, thereby forming a one-dimensional nanowire composite of porous substrate and zinc oxide and zinc selenide; optionally, the obtained one-dimensional nanowire composite of porous substrate and zinc oxide and zinc selenide is further immersed in a solution of +2 valent copper ion, e.g. a solution of copper nitrate, to form a composite of porous substrate and zinc oxide and copper selenide.

The present invention provides a composite of a porous substrate and a one-dimensional nanomaterial, which combines the characteristics of both the one-dimensional nanomaterial and the porous foam, and shows excellent adsorption properties. Meanwhile, the method for manufacturing thereof is simple and facile. In the present method, porous materials (e.g porous foamed nickel) are preferably used as the substrate for growth. A catalytic seed solution (also referred to as catalytic precursor solution, e.g. a solution of zinc acetate) is used to soak the porous substrate prior to the growth of the one-dimensional nanomaterial. The annealing is carried out at 200-500° C. after the catalytic precursor solution is air-dried. Homogeneously distributed nanoparticles (e.g. zinc oxide) are pre-formed on the porous substrate, and the porous substrate template coated with catalyst nanoparticles is disposed in the growth solution. Through a simple and low-cost hydrothermal method, many high-quality one-dimensional nanomaterials (e.g. zinc oxide) may be formed on the porous substrate in a controllable manner. By modulating the preparation process (e.g. diameter of the catalyst seed, growth temperature, growth time, etc.), desired one-dimensional nanomaterials (e.g. zinc oxide, such as nanowire, nanorod, nanobelt, etc.) with desired size, structure, and homogeneous density may be prepared on the porous substrate in a controllable manner. With the present method, the composite of the porous substrate (e.g. porous foamed nickel) and the one-dimensional nanomaterial (e.g. zinc oxide one-dimensional nanowire) may be produce in low cost and large scale, and the obtained composite shows excellent adsorption to organic solvents and greases.

The contribution of the present invention is a simple and low-cost preparation process, wherein a one-dimensional nanomaterial (e.g. zinc oxide one-dimensional nanomaterial), for example, nanowire, nanobelt, nanotube, etc. is grown on a porous substrate (e.g. porous foamed nickel) three-dimensionally skeleton, and the grown one-dimensional nanomaterial is homogeneously distributed on the porous substrate with tight binding at the interface. The diameter of the one-dimensional nanomaterial may be 10-200 nm, and the length thereof may be 500 nm-50 μm, which enable effective binding between the one-dimensional nanomaterial and the porous material (e.g. metal), thereby significantly improving the specific surface area of the porous material. The composite of porous foamed nickel/zinc oxide nanowire is coated with a layer of silicon oil by simple and rapid gas phase deposition. Test results indicate that the treated composite shows excellent adsorption to oils, and may be used to adsorb various organic solvents and greases, such as toluene, dichlorobenzene, gasoline, lubricating oil, motor oil, crude oil, petroleum ether, and the like. The weight ratio of adsorbed material to the composite is above 10.

DEFINITIONS OF TERMS

Unless otherwise indicated, the terms used in the present invention have the same meaning as conventionally defined in the art.

The porous substrate as used in the present invention is selected from porous materials having a porosity of 70% or above, including porous foamed metal, porous foamed plastics, alloy, organic substance or ceramics, and metallic skeleton with three-dimensional network of pores of 100 nm to 1 mm. The porous foamed metal includes porous foamed nickel, porous foamed titanium, porous foamed aluminum, porous foamed copper, and the like.

The one-dimensional nanomaterial refers to various solid super-fine material which has a microstructure wherein the size in at least one-dimensional direction is below 200 nm, including nanowire, nanorod, nanobelt, nanotube, and the like.

The catalytic seed solution as used in the present invention refers to an organic salt solution which is capable of forming homogeneous catalyst particles on a porous substrate, wherein the produced catalyst particles are capable of inducing the formation of the one-dimensional nanomaterial. Taking the growth of ZnO one-dimensional nanomaterial as an example, the catalytic seed solution thereof may be a solution of zinc acetate dissolved in absolute ethanol, and the concentration of zinc acetate is preferably $10^{-4}$-0.1 mol/L.

The growth solution as used in the present invention refers to a solution of combined ions providing an ion source for the formation of the one-dimensional nanomaterial. Taking the growth of ZnO one-dimensional nanomaterial as an example, the growth solution thereof is a mixed solution of urotropine, polyethanolamine and zinc nitrate hexahydrate dissolved in deionized water. The concentrations of urotropine, polyethanolamine and zinc nitrate hexahydrate in the growth solution may be 0.1-5 wt %, 0.1-10 wt % and 0.1-2 wt %, respectively.

The composite of the porous substrate and the one-dimensional nanomaterial as used in the present invention (also referred to as "porous substrate/one-dimensional nanomaterial", such as "porous foamed nickel/zinc oxide one-dimensional nanowire material") refers to a one-dimensional nanomaterial grown on a porous substrate, such as nanowire, nanobelt, nanotube, or the like. The grown one-dimensional nanomaterial is distributed on the porous substrate with tight binding at the interface.

The super-hydrophobicity as used in the present invention refers to that the contact angle between the material and water is above 150°.

The weight adsorption ratio as used in the present invention refers to the ratio of the total weight after adsorption excluding the deadweight before adsorption to the deadweight before adsorption.

The contact angle with water is used in the present invention when an equilibrium is formed among three phases, i.e. a material, water and air, to refer to the angle formed between the tangent of water-air interface and the material surface at any point around the circumference where the three phases join together and including the water drop.

The hydrothermal method as used in the present invention is a method wherein a high-temperature and high-pressure aqueous solution is used to solubilize the material which is insoluble or sparingly soluble under ambient conditions, or to react to form a solubilized product of said material, and control the temperature difference in the autoclave to produce a convection to form a super-saturation state for the growth of crystals.

EXAMPLES

The present invention will be illustrated with the following examples, but the present invention is not limited thereto.

The porous foamed nickel substrates used in the Examples are prepared by the inventors following know process in the art, and have a porosity of larger than 70% and a pore size of 0.05-1 mm.

The porous foamed polymer substrates used in the Examples may be manufactured from polyurethane, polyvinylchloride, polyethylene, polystyrene, etc., and the porosity and pore size thereof are similar to those of the porous foamed nickel substrates. The porous foamed polymer substrates may be commercially available from many sources, such as Yixingshi Jin Zhong Heat Preservation Material Co., Ltd.; Shaoxing Haiyan Polyurethane Co., Ltd.; etc.

Examples 1-5 serve to illustrate the fabrication of ZnO nanostructures on a porous foamed nickel template, in accordance with some embodiments of the present invention.

Example 1

A porous foamed nickel substrate was first washed with absolute ethanol and oven-dried. The substrate was then immersed in a solution of zinc acetate in absolute ethanol ($5 \times 10^{-3}$ mol/L) and ultrasonically treated for 30 minutes and air-dried. After that, the substrate was annealed at 200° C. for 30 min. The annealed substrate was immersed in a mixed solution of urotropine (0.35 wt %), polyethanolamine (1 wt %), and Zn(NO$_3$)$_2$.6H$_2$O (0.75 wt %) in deionized water and kept at 100° C. for 24 hours.

Figure 2:
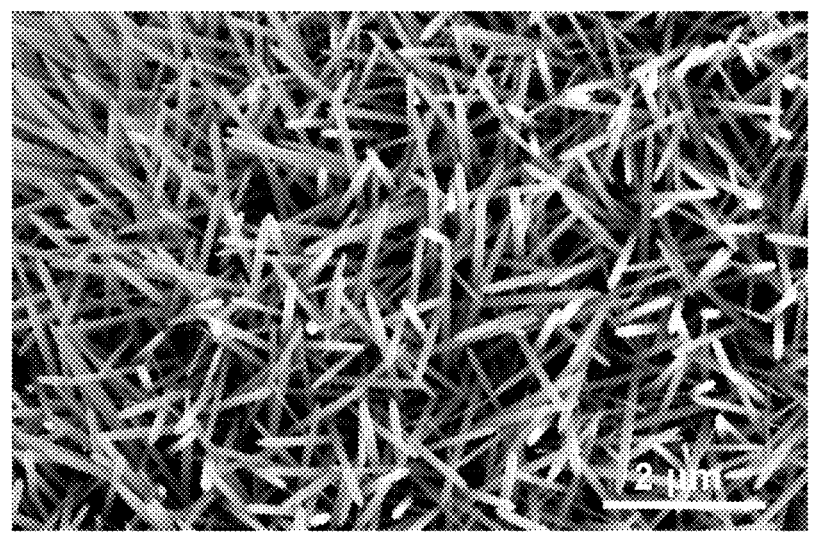
FIG. 2: A high-magnification SEM image of ZnO nanowires on porous foamed nickel substrate.

The obtained sample is ZnO nanowires homogeneously grown on the porous foamed nickel substrate, having a diameter of 50-150 nm, a length of 1-3 μm, and a density of 10$^9$-10$^{12}$/cm$^2$. See FIGS. 1-2.

Example 2

A porous foamed nickel substrate was first washed with absolute ethanol and oven-dried. The substrate was then immersed in a solution of zinc acetate in absolute ethanol (2×10$^{-3}$ mol/L) and ultrasonically treated for 60 minutes and air-dried. After that, the substrate was annealed at 200° C. for 30 min. The annealed substrate was immersed in a mixed solution of urotropine (0.35 wt %), polyethanolamine (0.20 wt %), and Zn(NO$_3$)$_2$.6H$_2$O (0.75 wt %) in deionized water and kept at 90° C. for 24 hours.

The obtained sample is ZnO nanowires homogeneously grown on the porous foamed nickel substrate, having a diameter of 100-200 nm, a length of 2-5 μm, and a density of 10$^8$-10$^{11}$/cm$^2$.

Example 3

A porous foamed nickel substrate was first washed with absolute ethanol and oven-dried. The substrate was then immersed in a solution of zinc acetate in absolute ethanol (5×10$^{-3}$ mol/L) and ultrasonically treated for 20 minutes and air-dried. After that, the substrate was annealed at 200° C. for 30 min. The annealed substrate was immersed in a mixed solution of urotropine (0.4 wt %), polyethanolamine (2 wt %), and Zn(NO$_3$)$_2$.6H$_2$O (0.5 wt %) in deionized water and kept at 80° C. for 15 hours.

The obtained sample is ZnO nanorods homogeneously grown on the porous foamed nickel substrate, having a diameter of 20-100 nm, a length of 3-4 μm, and a density of 10$^9$-10$^{12}$/cm$^2$.

Example 4

A porous foamed nickel substrate was first washed with absolute ethanol and oven-dried. The substrate was then immersed in a solution of zinc acetate in absolute ethanol (3×10$^{-3}$ mol/L) and ultrasonically treated for 100 minutes and air-dried. After that, the substrate was annealed at 400° C. for 40 min. The annealed substrate was immersed in a mixed solution of urotropine (2.0 wt %), polyethanolamine (5 wt %), and Zn(NO$_3$)$_2$.6H$_2$O (1.0 wt %) in deionized water and kept at 110° C. for 13 hours.

The obtained sample is ZnO nanobelts homogeneously grown on the porous foamed nickel substrate, having a width of 0.5-20 μm, a thickness of 20-100 nm, and a length of 5-100 μm. The distribution density is 10$^8$-10$^{10}$/cm$^2$.

Example 5

A porous foamed nickel substrate was first washed with absolute ethanol and oven-dried. The substrate was then immersed in a solution of zinc acetate in absolute ethanol (1×10$^{-3}$ mol/L) and ultrasonically treated for 60 minutes and air-dried. After that, the substrate was annealed at 300° C. for 20 min. The annealed substrate was immersed in a mixed solution of urotropine (1.0 wt %), polyethanolamine (2.0 wt %), and Zn(NO$_3$)$_2$.6H$_2$O (0.8 wt %) in deionized water and kept at 100° C. for 15 hours.

The obtained sample is ZnO nanowires homogeneously grown on the porous foamed nickel substrate, having a diameter of 10-50 nm, and a length of 0.5-5 μm. The distribution density is 10$^{10}$-10$^{11}$/cm$^2$.

Example 6

The porous foamed nickel/ZnO one-dimensional nanowires material obtained in Example 1 was coated with a layer of trimethyl silicone oil by a gas phase deposition at 300° C. for 60 min.

Figure 3:
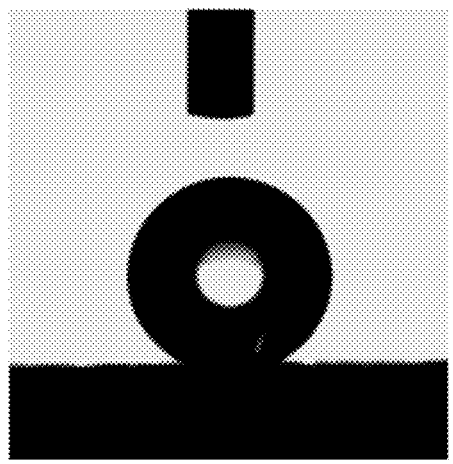
FIG. 3: An optical photograph with cross-sectional view of a water droplet on the surface of the sample of Example 6 of ZnO nanowires on porous foamed nickel substrate after silicon oil modification.

The porous foamed nickel/ZnO one-dimensional nanowires material treated with silicone oil was tested to find that the contact angle between the surfaced-modified porous foamed nickel/ZnO one-dimensional nanowires material and water was above 150° (FIG. 3). The method for measuring the contact angle used herein was profile image analysis method. Specifically, a contact angle analyzer (OCA20, Dataphysics Corporation, Germany) was employed. 5 μL water drop was dropped on the surface of the sample, and the profile image of the water drop was obtained with a microscopic lens and a camera. The contact angle of the water drop was calculated from the image by the digital image analysis software integrated in the instrument and a Young-Laplace equation calculating software.

Upon testing, the foamed nickel/ZnO one-dimensional nanowires material treated with silicone oil according to the present Example showed weight adsorption ratios of above 10 for gasoline, lubricating oil and crude oil.

Example 7

The porous foamed nickel/ZnO one-dimensional nanowires material obtained in Example 2 was coated with a layer of polydimethylsiloxane (PDMS) by a gas phase deposition at 110° C. for 180 min.

The obtained porous foamed nickel/ZnO one-dimensional nanowires material had a contact angle of above 150° with water. It showed weight adsorption ratios of above 10 for gasoline, lubricating oil and crude oil.

Example 8

0.015 g of Se and 0.015 g of NaBH$_4$ were dissolved in 30 mL of de-ionized water to prepare a Se$^{2-}$ source solution, into which the porous foamed nickel/ZnO one-dimensional nanowires material obtained in Example 3 was immersed for 2 hours at 50° C. Then, the sample was washed with de-ionized water and ethanol, and air-dried to form ZnSe/ZnO nanowires. The ZnSe/ZnO nanowires were then immersed in a 0.01-0.05 M copper nitrate solution for 4-10 hours at 20-60° C. Then, the sample was washed with de-ionized water and ethanol, and air-dried. Transmission electron microscopy and elemental analysis indicated the formation of porous foamed nickel/ZnO/CuSe nanowires. Transmission electron microscopy analysis showed that the diameters of the ZnO/CuSe nanowires increased by 10-100 nm comparing with the ZnO nanowires, and the length thereof increased by 50-200 nm, while the distribution density thereof remained unchanged.

Example 9

A porous foamed polymeric substrate was first washed with absolute ethanol and oven-dried. The substrate was then immersed in a solution of zinc acetate in absolute ethanol (5×10$^{-3}$ mol/L) and ultrasonically treated for 30 minutes and air-dried. After that, the substrate was annealed at 200° C. for 30 min. The annealed substrate was immersed in a mixed solution of urotropine (0.35 wt %), polyethanolamine (1 wt %), and $Zn(NO_3)_2 \cdot 6H_2O$ (0.75 wt %) in deionized water and kept at 100° C. for 24 hours.

The obtained sample is ZnO nanowires homogeneously grown on the porous foamed polymeric substrate, having a diameter of 50-150 nm, and a length of 1-3 μm. The distribution density is $10^9$-$10^{12}$/cm$^2$.

Example 10

The porous foamed polymeric substrate/ZnO one-dimensional nanowires material obtained in Example 9 was coated with a layer of silicon oil by a gas phase deposition at 120° C. for 60 min. The obtained porous foamed polymeric substrate/ZnO one-dimensional nanowires material had a contact angle of above 150° with water. It showed weight adsorption ratios of above 10 for gasoline, lubricating oil and crude oil.

Example 11

The porous foamed polymeric substrate/ZnO one-dimensional nanowires material obtained in Example 9 was coated with a layer of polydimethylsiloxane (PDMS) by a gas phase deposition at 110° C. for 180 min. The obtained porous foamed polymeric substrate/ZnO one-dimensional nanowires material had a contact angle of above 150° with water. It showed weight adsorption ratios of above 10 for gasoline, lubricating oil and crude oil.

Example 12

0.015 g of Se and 0.015 g of $NaBH_4$ were dissolved in 30 mL of de-ionized water to prepare a $Se^{2-}$ source solution, into which the porous foamed polymeric substrate/ZnO one-dimensional nanowires material obtained in Example 9 was immersed for 2 hours at 50° C. Then, the sample was washed with de-ionized water and ethanol, and air-dried. Transmission electron microscopy and EDS analysis indicated the formation of porous foamed polymeric substrate/ZnSe/ZnO nanowires. Transmission electron microscopy analysis showed that the diameters of the ZnSe/ZnO nanowires increased by 50-200 nm comparing with the ZnO nanowires, and the length thereof increased by 100-200 nm, while the distribution density thereof remained unchanged.

Example 13

The porous foamed polymeric substrate/ZnO one-dimensional nanowires material obtained in Example 9 was coated with a layer of silicone oil by a gas phase deposition at 120° C. for 120 min. The obtained porous foamed polymeric substrate/ZnO one-dimensional nanowires material had a contact angle of above 150° with water. It showed weight adsorption ratios of above 10 for gasoline, lubricating oil and crude oil.

Example 14

The porous foamed polymeric substrate/ZnSe/ZnO nanowires obtained in Example 12 were immersed in a 0.01-0.05 M copper nitrate solution for 4-10 hours at 20-60° C. Then, the sample was washed with de-ionized water and ethanol, and air-dried. Transmission electron microscopy and elemental analysis indicated the formation of porous foamed polymeric substrate/ZnO/CuSe nanowires. Transmission electron microscopy analysis showed that the diameters of the CuSe/ZnO nanowires increased by 20-150 nm comparing with the ZnO nanowires, and the length thereof increased by 50-180 nm, while the distribution density thereof remained unchanged.

Example 15

The porous foamed polymeric substrate/CuSe/ZnO nanowires material obtained in Example 14 was coated with a layer of silicone oil by a gas phase deposition at 120° C. for 120 min. The obtained porous foamed polymeric substrate/CuSe/ZnO nanowires material had a contact angle of above 150° with water. It showed weight adsorption ratios of above 10 for gasoline, lubricating oil and crude oil.

Example 16

The porous foamed polymeric substrate/ZnSe/ZnO nanowires material obtained in Example 12 was coated with a layer of silicone oil by a gas phase deposition at 120° C. for 120 min. The obtained porous foamed polymeric substrate/ZnSe/ZnO nanowires material had a contact angle of above 150° with water. It showed weight adsorption ratios of above 10 for gasoline.

Examples 17-18 serve to illustrate the oil adsorption test.

Example 17

Figure 4:
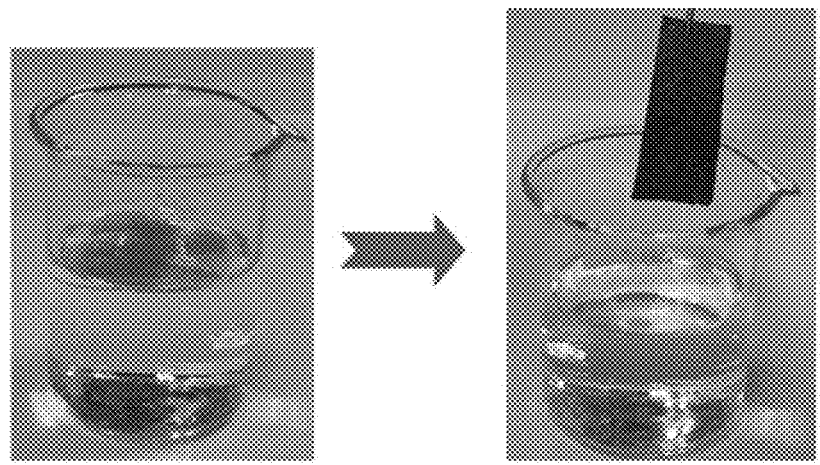
FIG. 4: Photographs showing the oil adsorption capability of a sample of Example 6 of ZnO nanowires on porous foamed nickel substrate for gasoline.

An oil adsorption test (FIG. 4) was carried out using a hierarchical sample comprising "spaghetti" like ZnO nanowires attached on a "sponge" like Ni microporous structure (0.21 g). The sample was immersed into a solution containing water and gasoline which had been intentionally labeled with blue dye. The test shows that the layer of oil was removed, and no water was adsorbed by the sample. The oil sorption capacity is calculated to be 11 g/g.

Example 18

An oil adsorption test was carried out using a hierarchical sample comprising "spaghetti" like ZnO nanowires attached on a "sponge" like Ni microporous structure (0.21 g). The sample was immersed into a solution containing water and motor oil which had been intentionally labeled with blue dye. The test shows that the layer of oil was removed, and no water was adsorbed by the sample. The oil sorption capacity is calculated to be 17 g/g.

We claim:

1. A composite of a porous substrate and a one-dimensional nanomaterial, wherein the porous substrate in the composite is a porous foamed polymer substrate having a porosity of 70% or above.

2. The composite of claim 1, wherein the one-dimensional nanomaterial is selected from the group consisting of zinc oxide, titanium oxide, zinc selenide, copper selenide, nickel selenide, cobalt selenide, iron selenide, manganese selenide, chromium selenide, vanadium selenide, titanium selenide, scandium selenide, copper sulfide, zinc sulfide, zinc sulfate, copper sulfate, nickel sulfate, cobalt sulfate, iron sulfate, manganese sulfate, chromium sulfate, vanadium sulfate, titanium sulfate and scandium sulfate.

3. The composite of claim 1, wherein the one-dimensional nanomaterial has a diameter of 10-200 nm and a length of 500 nm to 5 μm; or a width of 500 nm to 20 μm and a thickness of 20-100 nm, and a length of 5-100 μm; and the one-dimensional nanomaterial in the composite is distributed on the porous substrate with a density of $10^8$-$10^{12}$/cm$^2$.

4. The composite of claim 1, wherein the composite is manufactured by a hydrothermal method.

5. A surface-modified composite of a porous substrate and a one-dimensional nanomaterial, wherein the surface of the composite of claim 1 is modified to become super-hydrophobic.

6. The surface-modified composite of a porous substrate and a one-dimensional nanomaterial of claim 5, wherein a layer of silicone oil or polydimethylsiloxane is formed on un-modified surface of the composite.

7. The surface-modified composite of a porous substrate and a one-dimensional nanomaterial of claim 5, wherein the contact angle between the surface-modified composite and water is >150° and/or the surface-modified composite has a weight adsorption ratio of >10 to organic solvents or greases.

8. The surface-modified composite of a porous substrate and a one-dimensional nanomaterial of claim 7, wherein the organic solvents are selected from one or more of toluene, dichlorobenzene, gasoline and petroleum ether, and the greases are selected from one or more of lubricating oil, motor oil and crude oil.

* * * * *